United States Patent [19]
Schieber

[11] Patent Number: 5,909,747
[45] Date of Patent: Jun. 8, 1999

[54] RADIAL FLOW DIAPHRAGM VALVE

[75] Inventor: Richard H. Schieber, Erie, Pa.

[73] Assignee: American Meter Company, Horsham, Pa.

[21] Appl. No.: 09/054,978

[22] Filed: Apr. 3, 1998

[51] Int. Cl.⁶ .................................................. F16K 31/12
[52] U.S. Cl. .................. 137/492; 137/512.15; 251/331; 251/118
[58] Field of Search .................... 251/331, 118, 251/127, 126; 137/512.15, 492

[56] References Cited

U.S. PATENT DOCUMENTS

| | | | |
|---|---|---|---|
| 3,078,066 | 2/1963 | Moore | 251/331 |
| 3,468,344 | 9/1969 | Sanford | 251/331 |
| 4,217,921 | 8/1980 | Gidner | 137/512.15 |
| 4,579,147 | 4/1986 | Davies | 251/331 |
| 4,624,442 | 11/1986 | Duffy | 251/331 |
| 4,625,759 | 12/1986 | Craig | 137/613 |
| 4,712,580 | 12/1987 | Gilman | 137/512.15 |
| 4,828,219 | 5/1989 | Ohmi | 251/331 |
| 5,485,984 | 1/1996 | Itoi | 251/331 |

*Primary Examiner*—Denise L. Ferensic
*Assistant Examiner*—Ramyar Farid
*Attorney, Agent, or Firm*—David L. Davis

[57] ABSTRACT

A valve arranged for radial fluid flow from its inlet to its outlet has a spring-loaded diaphragm covering a valve cage member having a central opening communicating with the valve inlet surrounded by a plurality of peripheral openings communicating with the valve outlet. The valve cage member is downwardly concave and a valve top member closing off the valve body has an upwardly concave surface which is substantially the inverse of the concave surface of the valve cage member. Accordingly, the diaphragm moves from a zero flow configuration against the valve cage member to a full flow configuration against the valve top member symmetrically without stretching.

5 Claims, 10 Drawing Sheets

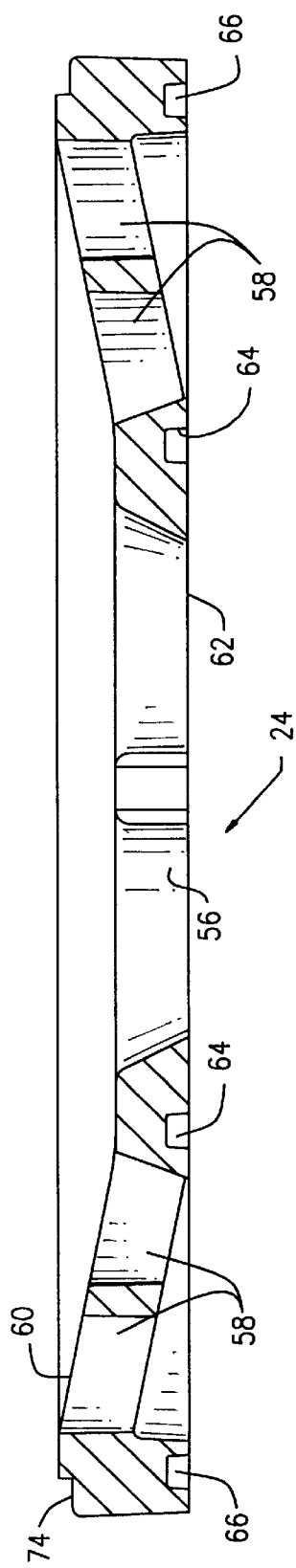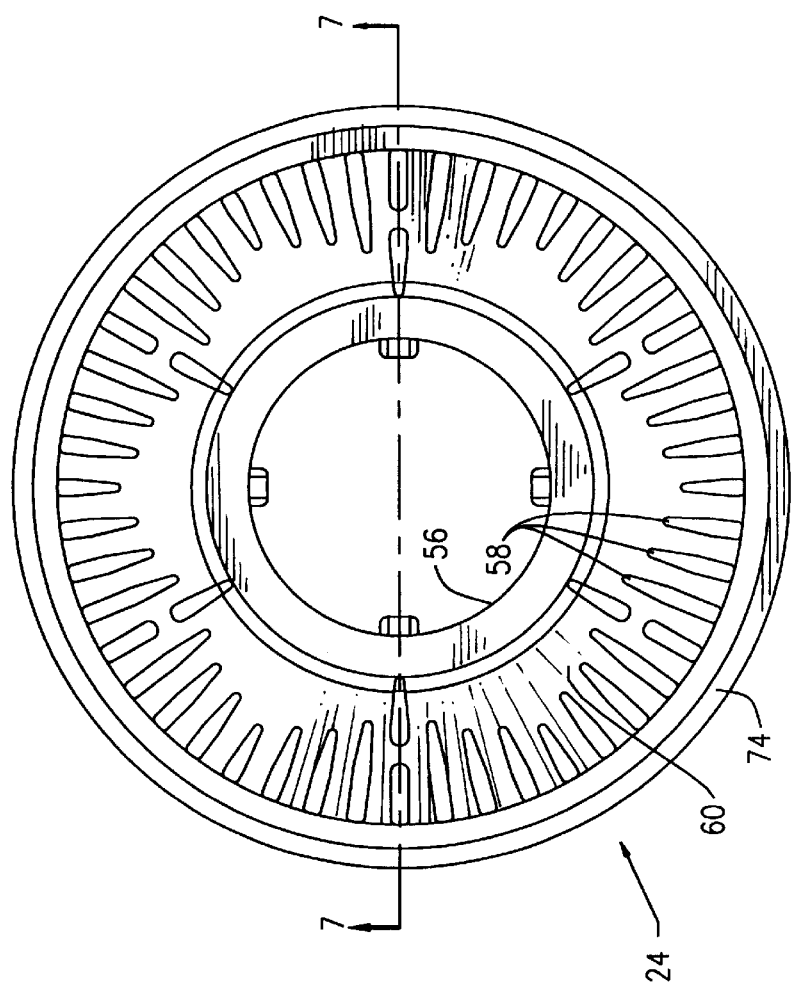
FIG. 7
FIG. 6

RADIAL FLOW DIAPHRAGM VALVE

BACKGROUND OF THE INVENTION

This invention relates to valves and, more particularly, to an improved diaphragm valve for regulating gas flow, wherein movement of the flexible diaphragm between zero flow configuration and a full flow configuration is effected without stretching the diaphragm.

Current devices for regulating fluid flow include throttling devices with orifices and valves actuated by lever mechanisms and pan-type rubber diaphragms to vary the orifice opening. These devices rely on the principle of equilibrium of forces to control pressure and suffer from elevated pressure effects, i.e., the outlet pressure varies as a function of the inlet pressure. Also, fluid flow capacities are restricted by the size of the orifice, which in turn is limited to the available shut off force.

Other devices employ slotted cages and molded rubber sleeves (or boots) that peel from the cage slots to throttle fluid flow. Sleeve and boot-type valves each have limitations. These valves have poor stability at low fluid flow rates through the valve. The fluid stream usually impinges substantially on the sleeve and deflects the fluid stream, thereby subjecting the sleeve to erosion. Other difficulties encountered are stretching and extrusion of the rubber sleeves as well as difficulties in the assembly, operation and use of such prior valves.

It is therefore apparent that a need exists for a fluid flow regulating valve which does not suffer from the above-enumerated deficiencies. A need also exists for such a valve which is easily serviced, without requiring removal of the entire valve from the pipeline in which it is installed.

SUMMARY OF THE INVENTION

The foregoing and additional objects are attained by providing a valve having a valve body with inlet and outlet ends, a top wall between the inlet and outlet ends and a valve chamber open to the top wall. An inlet passage, open to the inlet end and the valve chamber, and an outlet passage, open to the valve chamber and the outlet end, extend through the valve body. The outlet passage at least partially surrounds the inlet passage where the inlet and outlet passages open to the valve chamber. The valve also includes a generally disc-like valve cage member disposed in the valve chamber and overlying the openings of the inlet and outlet passages to the valve chamber. The valve cage member has a central opening in registration with the inlet passage opening and a plurality of peripheral openings surrounding the central opening and in registration with the outlet passage opening. A portion of the upper surface of the valve cage member opposite the openings of the inlet and outlet passages is generally concave and tapers upwardly from the central opening past the plurality of peripheral openings. A flexible diaphragm within the valve chamber overlies the valve cage member so as to cover the central opening and the plurality of peripheral openings. A valve top member is mounted to the valve body top wall over the valve chamber. The valve top member engages the periphery of the diaphragm to capture and sealingly engage the diaphragm periphery between the valve top member and the valve cage member. The valve top member is formed with an internal control chamber overlying the valve chamber. A spring is disposed in the control chamber and engages the valve top member and the diaphragm so as to yieldably bias the diaphragm into sealing contact with the valve cage member and prevent fluid flow from the inlet passage to the outlet passage through the central opening and the plurality of peripheral openings of the valve cage member. A channel through the valve top member provides fluid communication to the control chamber.

In accordance with an aspect of this invention, the central opening of the valve cage member is circular and each of the plurality of peripheral openings of the valve cage member comprises an elongated slot extending along a radius of the central opening.

In accordance with another aspect of this invention, the opening of the inlet passage to the valve chamber is circular and the opening of the output passage to the valve chamber is annular and concentric with the opening of the inlet passage to the valve chamber.

In accordance with a further aspect of this invention, the control chamber of the valve top member includes a surface opposite the upper surface portion of the valve cage member which is substantially the inverse of the upper surface portion of the valve cage member. Accordingly, the diaphragm can move symmetrically without elongation from a zero flow configuration in contact with the upper surface portion of the valve cage member to a full flow configuration in contact with the control chamber surface.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 6 is a top plan view of the valve cage member of the valve shown in FIG. 1;

FIG. 7 is a cross sectional view taken along the line 7—7 in FIG. 6;

DETAILED DESCRIPTION

Figure 1:
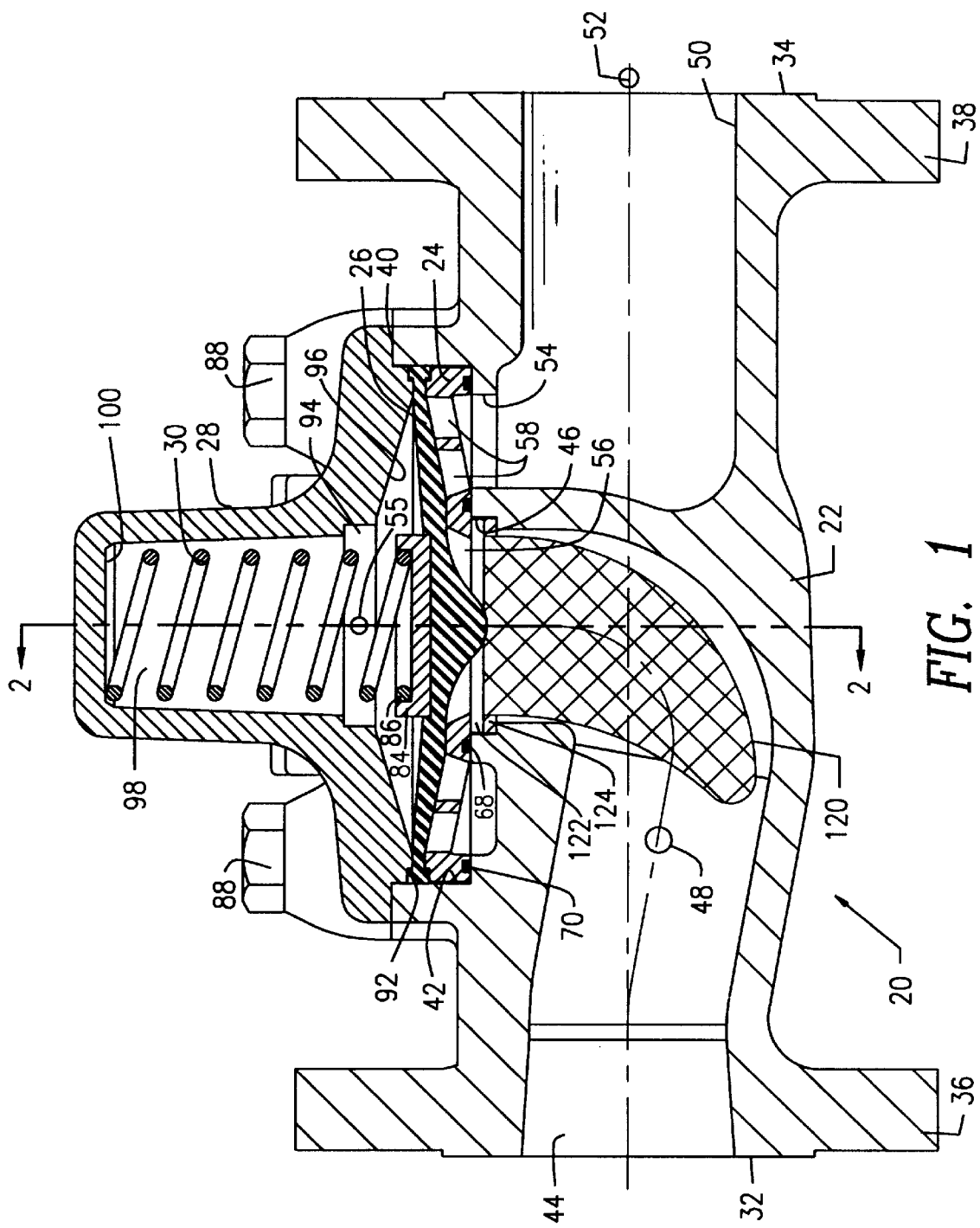
FIG. 1 is a longitudinal cross sectional view of an exemplary valve constructed according to this invention.

Referring now to the drawings, FIG. 1 shows an improved diaphragm valve, designated generally by the reference numeral 20, constructed according to the present invention. Major components of the valve 20 include the valve body 22, the valve cage member 24, the diaphragm 26, the valve top member 28 and the spring 30. As shown, the valve body 22 has an inlet end 32 and an outlet end 34. Parallel flanges 36, 38 at the inlet and outlet ends, respectively, are used for installing the valve 20 in a pipeline, as is conventional. The valve body 22 also has a top wall 40 between the inlet and outlet ends 32, 34. A valve chamber 42 open to the top wall 40 is formed in the valve body 22. Preferably, the top wall 40 is planar and orthogonal to the flanges 36, 38 and the valve chamber 42 is circular in section parallel to the top wall 40.

Figure 5:
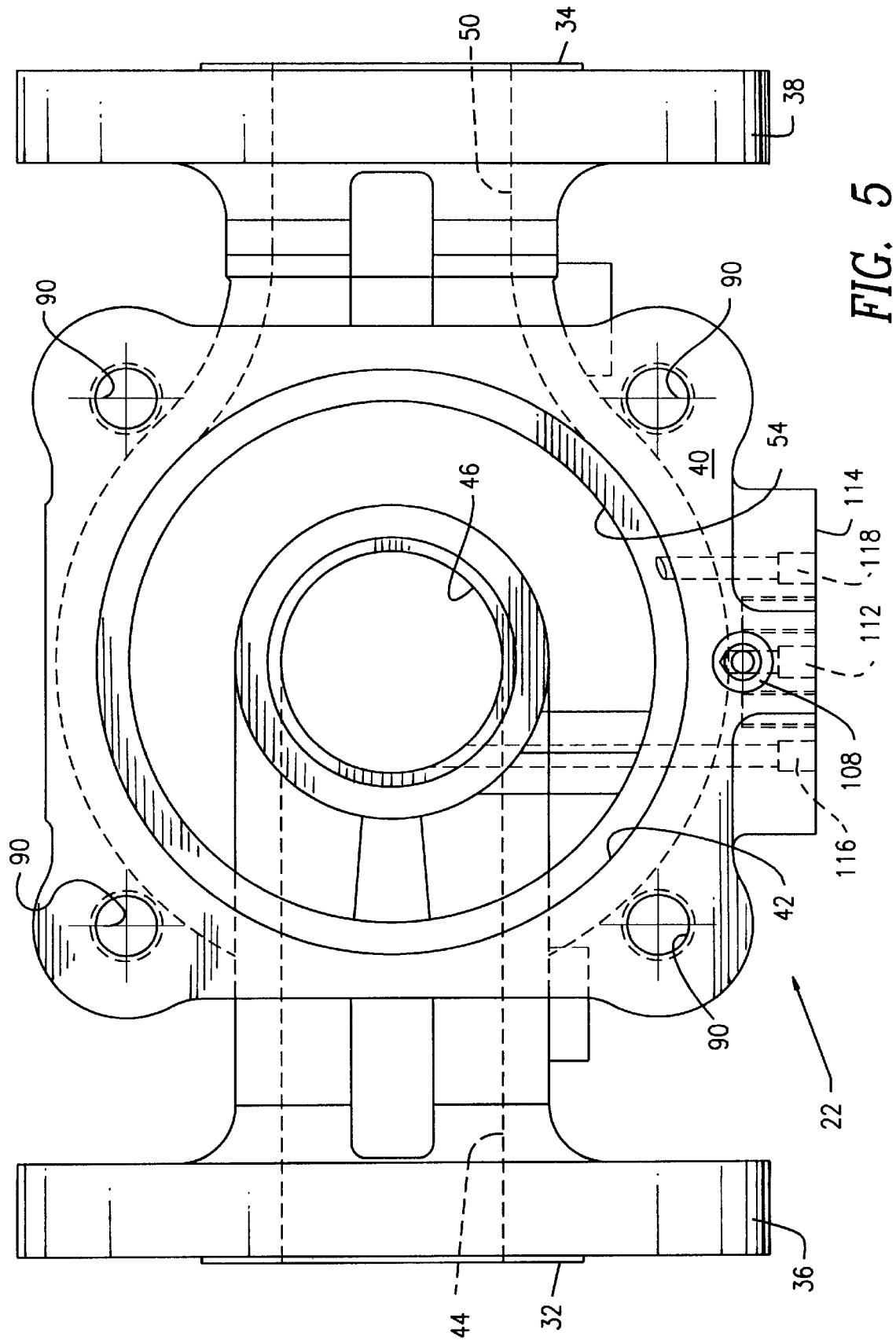
FIG. 5 is a top plan view of the valve body of the valve shown in FIG. 1.
Figure 8:
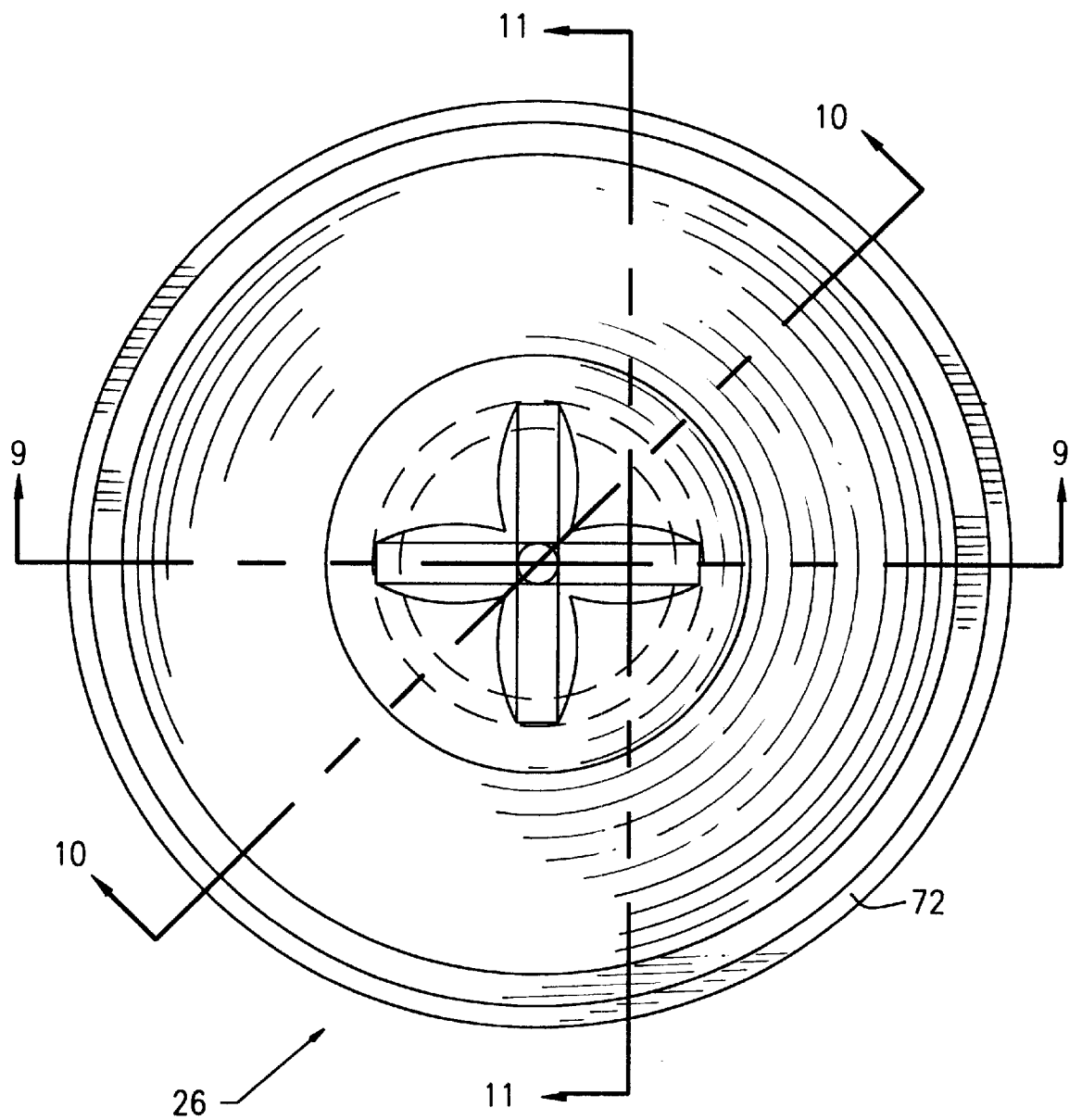
FIG. 8 is a bottom plan view of the diaphragm of the valve shown in FIG. 1.
Figure 9:
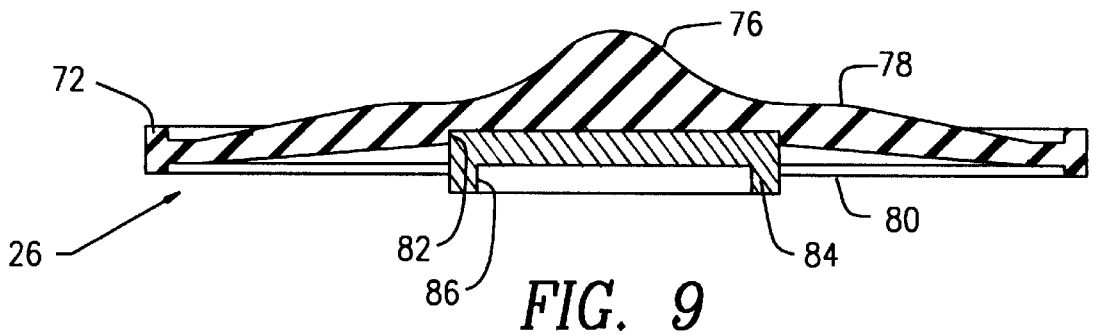
FIG. 9 is a cross sectional view taken along the line 9—9 in FIG. 8.
Figure 10:
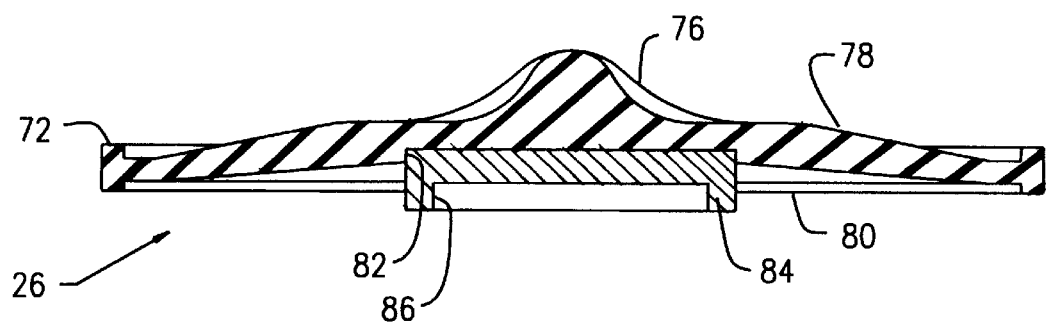
FIG. 10 is a cross sectional view taken along the line 10—10 in FIG. 8.
Figure 11:
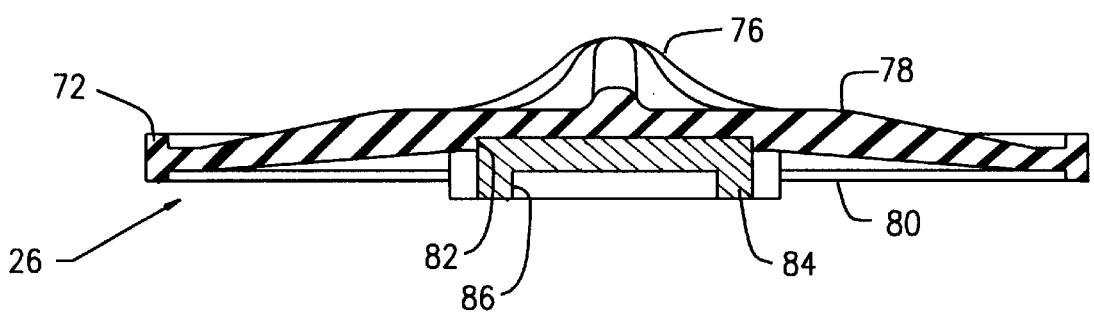
FIG. 11 is a cross sectional view taken along the line 11—11 in FIG. 8.

The valve body 22 is further formed with an internal inlet passage 44 extending through the valve body 22 and open to the inlet end 32 and the valve chamber 42. As shown, between the inlet end 32 and the valve chamber 42, the inlet passage 44 makes a 90° turn with smooth area transitions to reduce the flow turbulence. Preferably, the inlet passage opening 46 to the valve chamber 42 is circular, as is the opening of the inlet passage 44 to the inlet end 32. Further, the inlet passage 44 is preferably circular in cross section along its length orthogonal to the flow line 48. The valve body 22 is also formed with an internal outlet passage 50 which is open to the outlet end 34 and the valve chamber 42. The opening of the outlet passage to the outlet end 34 is preferably circular and shares a common centerline 52 with the opening of the inlet passage 44 to the inlet end 32. The outlet passage 50 at least partially surrounds the inlet passage 44 where the inlet and outlet passages open to the valve chamber 42. Preferably, as best seen in FIG. 5, the opening 54 of the outlet passage 50 to the valve chamber 42 is annular and concentric with the opening 46 of the inlet passage 44 to the valve chamber 42. The opening 46 of the inlet passage 44 to the valve chamber 42 and the opening 54 of the outlet passage 50 to the valve chamber 42 share a common centerline 55 which is orthogonal to the centerline 52.

The valve cage member 24 is disposed in the valve chamber 42 overlying the openings 46, 54 of the inlet and outlet passages, respectively, into the valve chamber. As shown, the valve cage member 24 is generally disc-like and is formed with a central opening 56 and a plurality of peripheral openings 58. The central opening 56 is in registration with the opening 46 of the inlet passage 44 into the valve chamber 42 and preferably is generally circular. The peripheral openings 58 surround the central opening 56 and are in registration with the opening 54 of the outlet passage 50 into the valve chamber 42. Preferably, each of the peripheral openings 58 is an elongated slot extending along a radius of the central opening 56. For full flow, the total area of all of the plurality of peripheral openings 58 must be at least equal to the area of the central opening 56.

As best shown in FIG. 7, the valve cage member 24 has a portion 60 of its upper surface which tapers upwardly from the central opening 56 past the plurality of peripheral openings 58 so as to be generally concave. The lower surface 62 of the valve cage member 24 is formed with a first annular groove 64 surrounding the central opening 56 and inward of the plurality of peripheral openings 58 and a second annular groove 66 surrounding the peripheral openings 58. A first seal ring 68 is disposed in the groove 64 and a second seal ring 70 is disposed in the groove 66. As shown in FIG. 1, the seal ring 68 surrounds the opening 50 of the inlet passage 44 into the valve chamber 42 and is between the valve body 22 and the valve cage member 24, and the seal ring 70 surrounds the opening 54 of the outlet passage 50 into the valve chamber 42 and is between the valve body 22 and the valve cage member 24.

Figure 2:
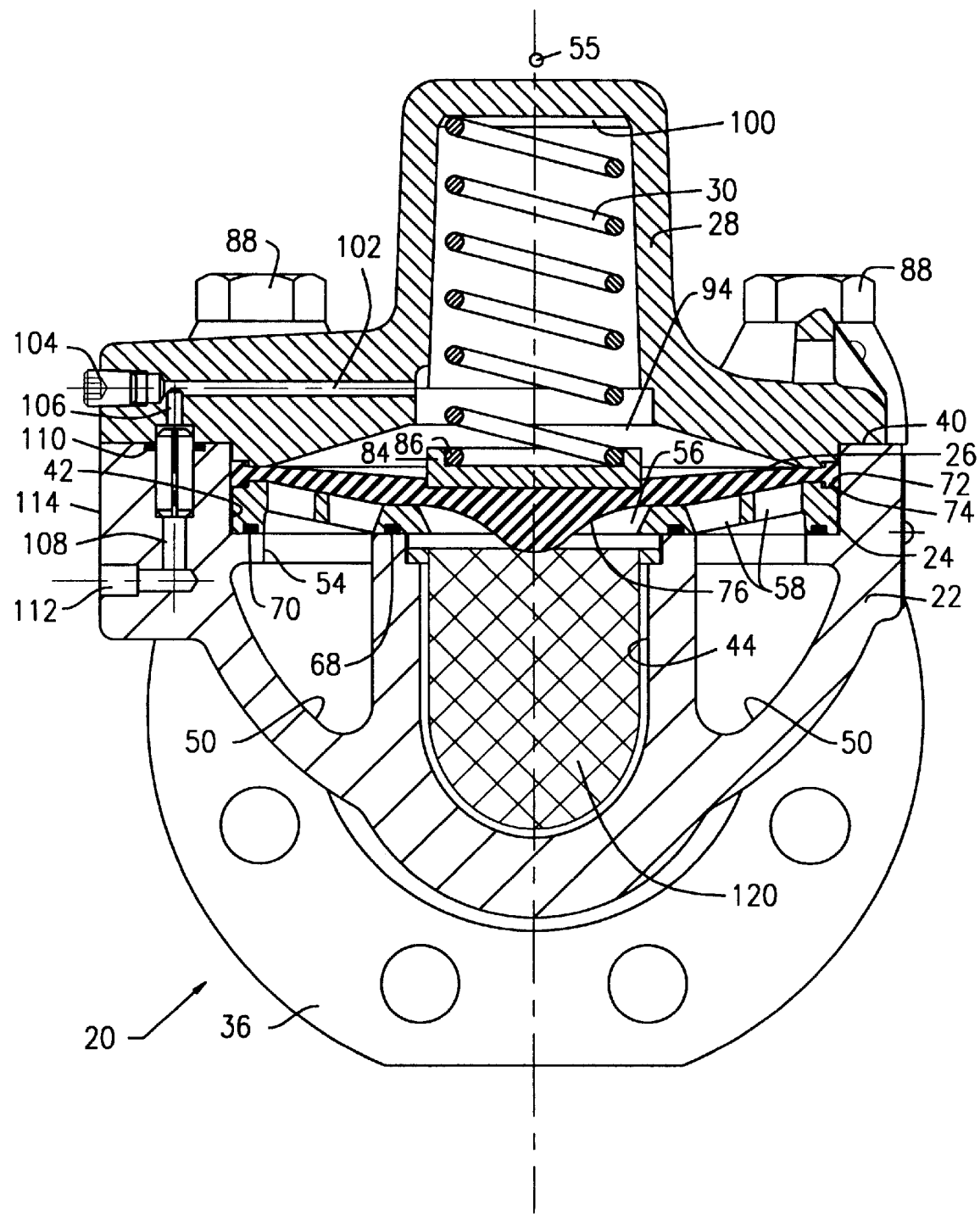
FIG. 2 is a cross sectional view taken along the line 2—2 of FIG. 1 showing the diaphragm in its zero flow configuration in contact with the valve cage member.

The diaphragm 26 overlies the valve cage member 24 to cover the central opening 56 and the peripheral openings 58. In plan, the diaphragm 26 is circular, having a circumferential flange 72 sized to fit within the annular channel 74 at the periphery of the valve cage member 24. At its center, the diaphragm 26 is formed on its lower surface with a generally conical projection 76 which extends into the central opening 56 of the valve cage member 24. Moving outwardly from the central conical projection 76, the lower surface 78 of the diaphragm 26 is complemental to the upper surface portion 60 of the valve cage member 24 in the region of the valve cage member 24 extending from the periphery of the central opening 56 past the plurality of peripheral openings 58. Accordingly, as best shown in FIGS. 1 and 2, when unstressed the lower surface 78 of the diaphragm 26 engages the upper surface portion 60 of the valve cage member 24 surrounding the plurality of peripheral openings 58 so as to seal the peripheral openings 58 as well as the central opening 56. Opposite the conical projection 76, the upper surface 80 of the diaphragm 26 is formed with a circular cavity 82 in which is disposed a rigid spring cup 84. The spring cup 84 has a central cavity 86 for containing therein the spring 30, as will be described.

The valve chamber 42 is sealed by the valve top member 28 which is mounted to the top wall 40, illustratively by bolts 88 which extend through suitable holes in the top member 28 and into threaded holes 90 in the valve body 22. The valve top member 28 is formed with a circumferential channel 92 which holds the circumferential flange 72 of the diaphragm 26. Thus, the valve top member 28 captures the periphery of the diaphragm 26 between the valve top member 28 and the valve cage member 24 and effects a seal. The valve top member 28 is further formed with an internal control chamber 94 which overlies the valve chamber 42. The control chamber 94 is circular in section orthogonal to the centerline 55. At its lower end, the control chamber 94 is defined by a surface 96 which is substantially the inverse of the upper surface portion 60 of the valve cage member 24. The upper region 98 of the control chamber 94 is cylindrical, concentric with the centerline 55. The spring 30 is preferably a helical compression spring which is within the cylindrical upper region 98 of the control chamber 94. The upper end of the spring 30 engages the upper wall 100 of the control chamber 94 and the lower end of the spring 30 is contained within the spring cup 84. Accordingly, the spring 30 yieldably biases the diaphragm 26 downwardly into sealing contact with the valve cage member 24.

As is known, flow from the inlet passage 44 to the outlet passage 50 is controlled by regulating the pressure differential across the diaphragm 26 between the inlet passage 44 and the control chamber 94, this pressure differential acting against the force of the spring 30 to unseat the diaphragm 26 from the valve cage member 24 when the inlet passage pressure is sufficiently greater than the control chamber pressure. Accordingly, a control channel 102 (FIG. 2) is formed through the valve top member 28 to provide fluid communication to the control chamber 94. Since the valve 20 has been designed so that it can be serviced by removing the top member 28 without removing the entire valve 20 from the pipeline, it is also desired that control loop connections be made to the valve body 22, rather than to the top member 28. Accordingly, the channel 102 is sealed with a plug 104 and a vertical channel 106 intersecting the channel 102 is also formed in the top member 28. The channel 106 is aligned with the vertical channel 108 formed in the valve body 22 when the top member 28 is installed thereon. Sealing of these channels is effected by the seal ring 110. A horizontal channel 112 is formed in the valve body 22 from its front wall 114. The channel 112 intersects the channel 108. Accordingly, fluid communication to the control chamber 94 may be effected from the front wall 114 of the valve body 22. As shown in FIG. 5, a channel 116 is formed through the valve body 22 from the front wall 114 to the inlet passage 44, and a similar channel 118 is formed through the valve body 22 from the front wall 114 to the outlet passage 50. Accordingly, valve control may be effected by connections to the front wall 114 of the valve body 22 and the valve may be serviced without disturbing any of those control connections.

In the event the valve 20 is used in an environment where there may be debris in the gas line, particularly in a new installation, an inlet strainer 120 may be installed in the inlet passage 44. The strainer 120 is preferably formed from stainless steel screen material attached to a circular metal ring 122. The ring 122 is sized to fit within the opening 46 of the inlet passage 44 to the valve chamber 22, with a gasket spacer 124 under the ring 122 securing a tight fit for the ring 122 between the valve body 22 and the valve cage member 24.

Figure 12:
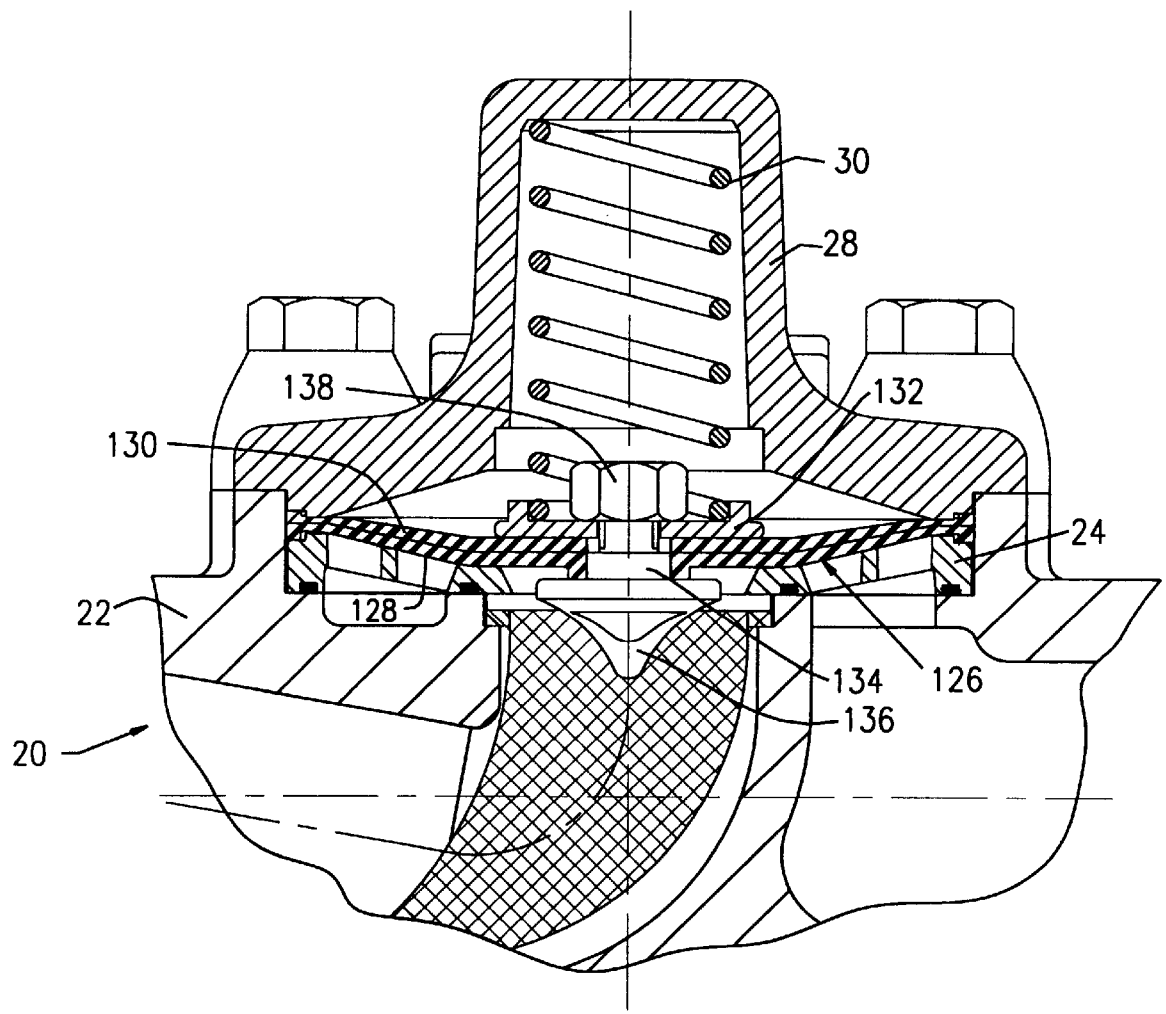
FIG. 12 is a detail of the cross sectional view of FIG. 1 showing the valve with a heavy duty diaphragm assembly.

FIG. 12 illustrates the valve 20 with an optional heavy duty diaphragm assembly 126 used in high pressure applications. As shown, the heavy duty diaphragm assembly 126 includes two layers 128, 130 of flexible diaphragm material and a fabric reinforcement, a spring cup 132 adjacent the upper layer 130, a diaphragm shaft 134 having a deflector 136, and a nut 138 securing the heavy duty diaphragm assembly 126 together.

Figure 13:
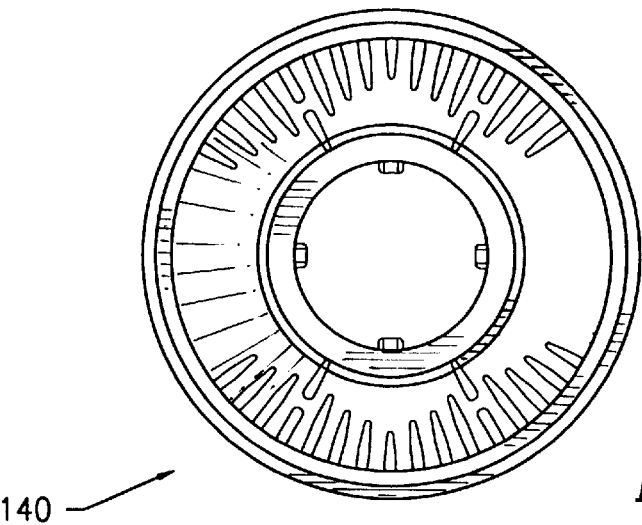
FIG. 13 is a top plan view of a valve cage member designed for maximum of 75% flow.
Figure 14:
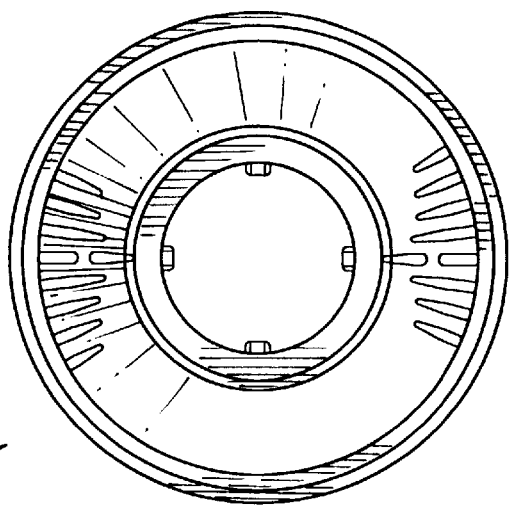
FIG. 14 is a top plan view of a valve cage member designed for maximum of 50% flow.
Figure 15:
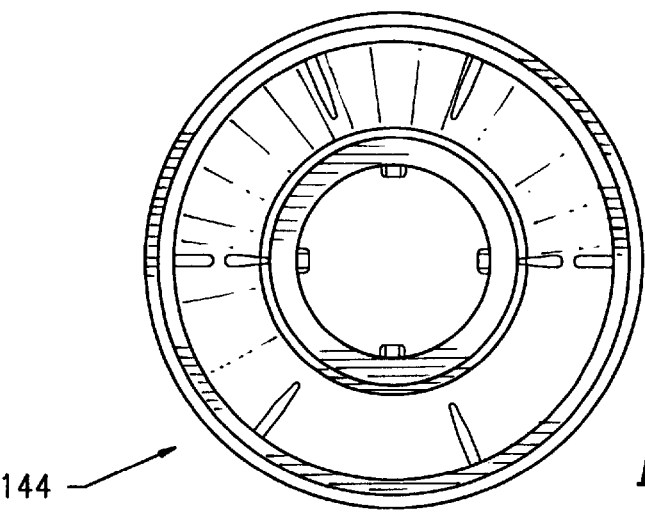
FIG. 15 is a top plan view of a valve cage member designed for maximum of 25% flow.

There may be applications where it is desired to set an upper limit on the outlet flow as a percentage of the inlet flow. Therefore, modified valve cage members are provided wherein the total area of the peripheral openings is a percentage of the area of the central opening. Accordingly, FIG. 13 depicts a valve cage member 140 arranged to allow up to 75% of full flow; FIG. 14 depicts a valve cage member 142 arranged to allow up to 50% of full flow; and FIG. 15 depicts a valve cage member 144 arranged to allow up to 25% of full flow.

It would be desirable to control the opening and/or closing profile of the valve 20 in order to provide greater pressure stability. This is accomplished in the design of the valve cage member 24, by the selection of the peripheral openings 58 in a progressive manner having no common radius from the central opening 56, or in a pattern having peripheral opening starting points describing a fixed and repeating number of common radii from the central opening 56, so as to provide a more linear, logarithmic or tailored opening and closing characteristic. Further, the peripheral openings 58 may be selectively non-continuous (bridged) to alter the opening and closing characteristics. Illustratively, as shown in FIG. 6, the peripheral openings 58 are divided into two groups, with the number of peripheral openings in the first group being less than the number of peripheral openings in the second group. The peripheral openings in the first group, illustratively six in number, are all closer to the central opening 56 than are the peripheral openings in the second group, illustratively forty eight in number. Thus, as the diaphragm 26 lifts off the valve cage member 24, the relatively few peripheral openings in the first group are initially exposed, so that the flow through the valve 20 increases gradually. If, on the other hand, it is desired to effect a gradual flow decrease as the diaphragm 26 reseats on the valve cage member 24, the fewer peripheral openings in the first group would be farther from the central opening 56 than would be the peripheral openings in the second group. Thus, by arranging the peripheral openings 58 of the valve cage member 24 at selected relative distances from the central opening 56, a desired opening and/or closing profile can be attained.

Figure 3:
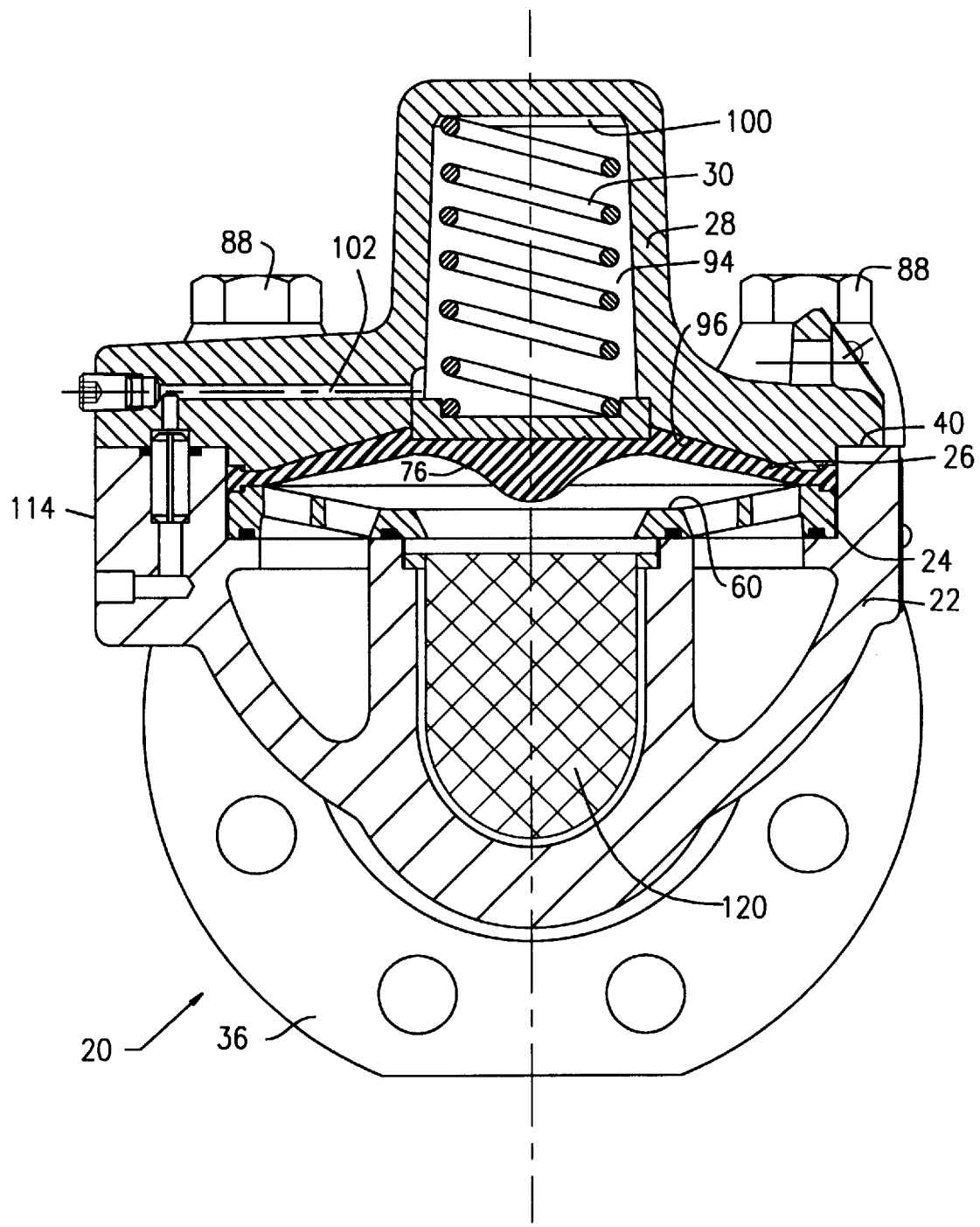
FIG. 3 is a view similar to FIG. 2 showing the diaphragm in its full flow configuration in contact with the control chamber surface.
Figure 4:
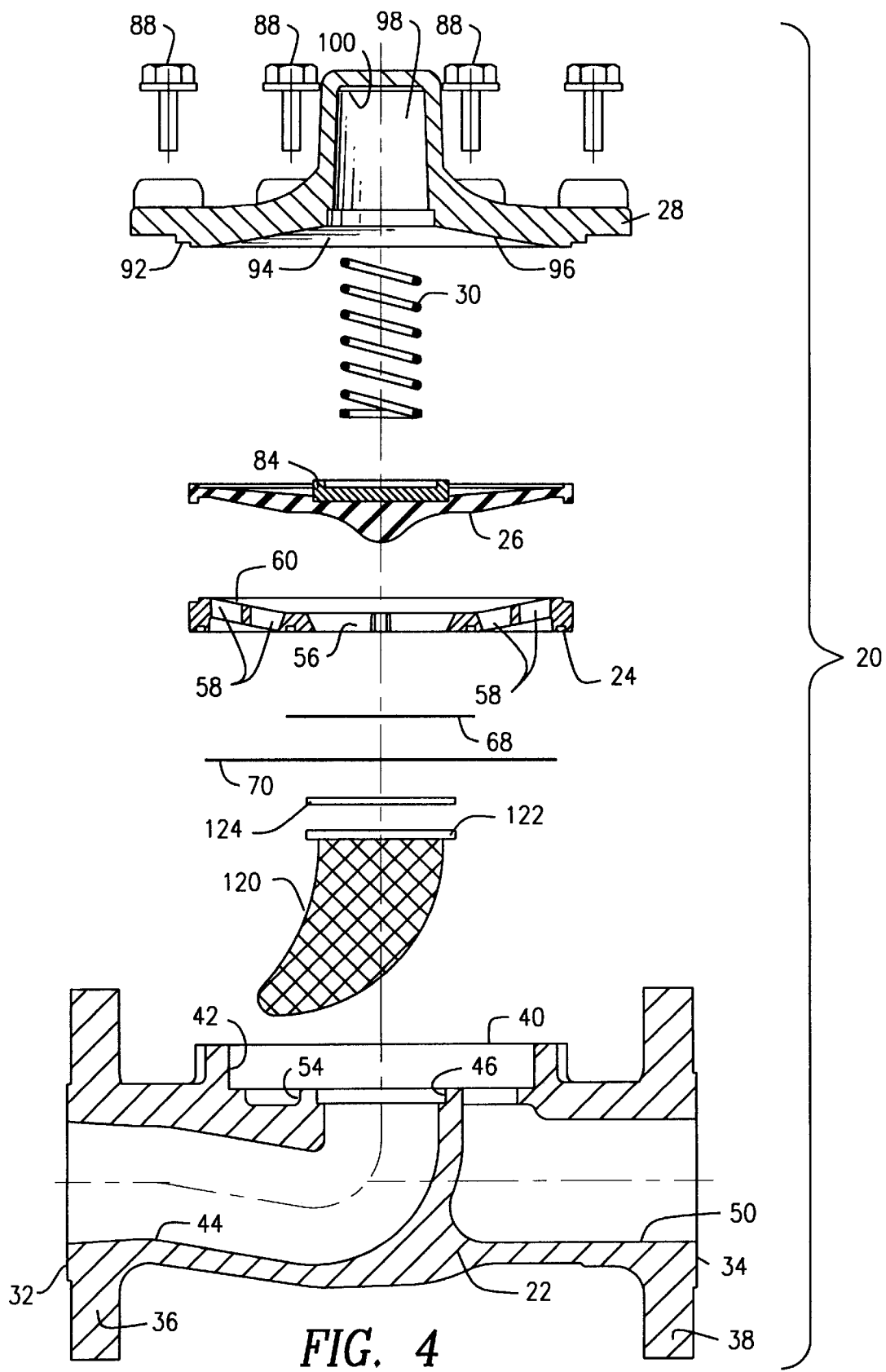
FIG. 4 is an exploded longitudinal cross sectional view of the valve shown in FIG. 1.

The valve 20 is what is known as a pilot unloading type regulator which responds to differential pressure between the control chamber 94 and the inlet passage 44. A manifold (not shown) is mounted to the front wall 114 of the valve body 22. The manifold provides connections to the channels 112, 116, 118 (FIG. 5) and also provides a connection, which may include a variable restrictor, between the channels 116 and 112. When the valve 20 is configured as a single stage pressure reducer, a pilot valve is coupled between the channels 112 and 118 and has its sensing port connected downstream of the valve 20. When the downstream pressure decreases, the effective opening of the pilot valve is increased. This exhausts gas from the control chamber 94 to lower its pressure and allows the diaphragm 26 to lift from the valve cage member 24 against the force of the spring 30, permitting gas to flow through the valve. FIG. 3 illustrates the full flow configuration of the valve 20, wherein the diaphragm 26 is against the surface 96 of the control chamber 94. Since the surface 96 is the inverse of the surface 60 of the valve cage member 24, there is no stretching of the diaphragm as it moves symmetrically without elongation from its zero flow configuration (FIG. 2) to its full flow configuration (FIG. 3). The conical projection 76 of the diaphragm 26 assists in directing the gas flow from the central opening 56 of the valve cage member 24 to the peripheral openings 58.

When the downstream pressure increases, the pilot closes and the pressure in the control chamber 94 approaches the pressure in the inlet passage 44. Accordingly, as the differential pressure across the diaphragm 26 decreases, the spring 30 moves the diaphragm 26 downwardly to provide a positive lockup of the valve 20 in the closed position.

The valve 20 may be utilized in many different industry-standard applications in addition to the single stage pressure reduction described above. Thus, the valve 20 may be utilized in a two stage pressure reduction application; in a pressure reduction with monitor application; as a two stage regulator with monitor override; as a pressure relief valve; for on/off control; for underpressure shut off; and for pressure regulation with an instrument controller. Various other applications are possible.

As disclosed, the valve 20 may be readily serviced without removing it from a pipeline in which it is installed. Thus, by unscrewing the bolts 88, the valve top member 28 may be removed without disturbing any of the control connections, which are effected through the valve body. After the valve top member 28 is removed, the spring 30, the diaphragm 26, the valve cage member 24, and the strainer 120 are all accessible for maintenance purposes.

Accordingly, there has been disclosed an improved diaphragm valve for regulating gas flow. While several illustrative embodiments of the present invention have been disclosed herein, it will be apparent to one of skill in the art that various modifications to the disclosed embodiments are possible and it is intended that this invention be limited only by the scope of the appended claims.

What is claimed is:

1. A valve for regulating the flow of fluid therethrough, comprising:

a valve body having an inlet end, an outlet end, a top wall between said inlet and outlet ends, a valve chamber in said valve body open to said top wall, an inlet passage extending through said valve body and open to said inlet end and said valve chamber with the opening of said inlet passage to said valve chamber being circular, and an outlet passage extending through said valve body and open to said valve chamber and said outlet end, wherein said outlet passage is annular and concentric with the opening of said inlet passage to said valve chamber to at least partially surround said inlet passage where said inlet and outlet passages open to said valve chamber, the opening of said inlet passage to said valve body inlet end and the opening of said outlet passage to said valve body outlet end sharing a first centerline which is orthogonal to a second centerline which is defined by the concentric openings of the inlet and outlet passages to the valve chamber;

a generally disc-like valve cage member disposed in said valve chamber and overlying the openings of said inlet and outlet passages to said valve chamber, said valve cage member having a central opening in registration with the opening of said inlet passage to said valve chamber and a plurality of peripheral openings surrounding said central opening and in registration with the opening of said outlet passage to said valve chamber, a portion of the upper surface of said valve cage member opposite the openings of said inlet and outlet passages to said valve chamber being generally concave and tapering upwardly from a planar region surrounding said central opening and past said plurality of peripheral openings;

a flexible diaphragm within said valve chamber and overlying said valve cage member so as to cover said central opening and said plurality of peripheral openings, said diaphragm including a spring cup on the side of said diaphragm opposite said valve cage member, said spring cup having a flat surface adjacent said diaphragm and parallel to said valve cage member planar region, said spring cup flat surface being larger than said valve cage member central opening so that said spring cup provides support to said diaphragm across said valve cage member central opening and onto said valve cage member planar region for sealing contact thereon, said diaphragm in its unstressed state having a lower surface which is complemental to the portion of the upper surface of said valve cage member in the region of said valve cage member extending from the periphery of said central opening past said plurality of peripheral openings;

a valve top member mounted to said valve body top wall over said valve chamber, said valve top member engaging the periphery of said diaphragm to capture and sealingly engage the diaphragm periphery between the valve top member and the valve cage member, the valve top member being formed with an internal control chamber overlying the valve chamber, said control chamber of said valve top member including a surface opposite said upper surface portion of said valve cage member which is substantially the inverse of said upper surface portion of said valve cage member;

a spring disposed in the control chamber of the valve top member, the spring engaging the valve top member and the diaphragm spring cup to yieldably bias the diaphragm into sealing contact with the valve cage member and prevent fluid flow from the inlet passage to the outlet passage through the central opening and the plurality of peripheral openings of the valve cage member; and a channel through said valve top member providing fluid communication to said control chamber;

wherein said valve chamber, said valve cage member and said diaphragm are all circular in section orthogonal to said second centerline;

whereby said diaphragm moves symmetrically without elongation or rolling from a zero flow configuration in contact with said upper surface portion of said valve cage member to a full flow configuration in contact with said control chamber surface, said diaphragm being compressively loaded in flow configurations between said zero flow and full flow configurations.

2. The valve according to claim 1 wherein said diaphragm is formed with a generally conical projection extending into said central opening of said valve cage member to direct fluid flow from said central opening toward said plurality of peripheral openings of said valve cage member.

3. The valve according to claim 1 wherein:

said central opening of said valve cage member is circular and each of said plurality of peripheral openings of said valve cage member comprises an elongated slot extending along a radius of said central opening;

said plurality of peripheral openings of said valve cage member are arranged at distances relative to said central opening to effect a desired opening and closing profile for said valve; and said peripheral openings in said first group are closer to said central opening than are said peripheral openings in said second group;

whereby a gradual flow increase through said valve is effected as said diaphragm lifts off said valve cage member.

4. The valve according to claim 1 wherein:

said control chamber of said valve top member is circular in section orthogonal to said second centerline and includes a central cylindrical portion concentric with said second centerline; and said spring comprises a helical compression spring disposed in said central cylindrical portion.

5. The valve according to claim 1 further including:

a first seal ring surrounding the opening of said inlet passage into said valve chamber and between said valve body and said valve cage member; and a second seal ring surrounding the opening of said outlet passage into said valve chamber and between said valve body and said valve cage member.

* * * * *

UNITED STATES PATENT AND TRADEMARK OFFICE
CERTIFICATE OF CORRECTION

PATENT NO. : 5,909,747
DATED : June 8, 1999
INVENTOR(S) : Richard H. Schieber and William H. Baisley It is certified that error appears in the above-indentified patent and that said Letters Patent is hereby corrected as shown below:

On the title page, item [75],
   Add the Inventor:

William H. Baisley, Erie, PA

Signed and Sealed this

Twelfth Day of October, 1999

Attest:

Q. TODD DICKINSON

*Attesting Officer*     *Acting Commissioner of Patents and Trademarks*